US007556562B2

(12) United States Patent
Pierce

(10) Patent No.: US 7,556,562 B2
(45) Date of Patent: Jul. 7, 2009

(54) METHOD AND SYSTEM FOR CONVERTING A SLOT MACHINE

(75) Inventor: Jesse Pierce, Las Vegas, NV (US)

(73) Assignee: IGT, Reno, NV (US)

( * ) Notice: Subject to any disclaimer, the term of this patent is extended or adjusted under 35 U.S.C. 154(b) by 352 days.

(21) Appl. No.: 11/090,091

(22) Filed: Mar. 25, 2005

(65) Prior Publication Data

US 2005/0176492 A1 Aug. 11, 2005

Related U.S. Application Data

(63) Continuation of application No. 10/611,794, filed on Jun. 30, 2003, now Pat. No. 6,896,260.

(51) Int. Cl.
*A63F 13/00* (2006.01)
*A63B 71/00* (2006.01)

(52) U.S. Cl. .................................... 463/20; 273/138.1

(58) Field of Classification Search .................. 463/20, 463/46

See application file for complete search history.

(56) References Cited

U.S. PATENT DOCUMENTS

| | | | | |
|---|---|---|---|---|
| 5,380,008 | A * | 1/1995 | Mathis et al. | 463/18 |
| 5,544,728 | A * | 8/1996 | Dabrowski | 194/206 |
| 5,988,638 | A * | 11/1999 | Rodesch et al. | 273/143 R |
| 6,224,483 | B1 | 5/2001 | Mayeroff | |
| 6,336,863 | B1 * | 1/2002 | Baerlocher et al. | 463/27 |
| 6,394,900 | B1 * | 5/2002 | McGlone et al. | 463/20 |
| 6,398,220 | B1 | 6/2002 | Inoue | |
| 6,475,087 | B1 * | 11/2002 | Cole | 463/20 |
| 6,663,489 | B2 * | 12/2003 | Baerlocher | 463/20 |
| 6,712,694 | B1 | 3/2004 | Nordman | |
| 6,896,260 | B2 | 5/2005 | Pierce | |
| 6,905,407 | B2 | 6/2005 | Nordman | |
| D509,256 | S | 9/2005 | Pierce | |
| 6,974,129 | B2 | 12/2005 | Nordman | |
| 7,217,189 | B2 | 5/2007 | Kaminkow | |
| 7,278,638 | B2 | 10/2007 | Nordman | |
| 7,326,112 | B2 | 2/2008 | Nordman | |
| 7,331,861 | B2 | 2/2008 | Nordman | |
| 2002/0111206 | A1 * | 8/2002 | Van Baltz et al. | 463/17 |
| 2003/0027628 | A1 * | 2/2003 | Luciano | 463/20 |
| 2003/0064773 | A1 * | 4/2003 | Baerlocher et al. | 463/16 |
| 2003/0064796 | A1 * | 4/2003 | Glavich et al. | 463/25 |
| 2003/0195034 | A1 * | 10/2003 | Dunaevsky | 463/20 |
| 2004/0014517 | A1 * | 1/2004 | Inoue | 463/20 |
| 2004/0048660 | A1 | 3/2004 | Gentles et al. | |
| 2004/0051241 | A1 * | 3/2004 | Seelig et al. | 273/143 R |
| 2004/0053699 | A1 | 3/2004 | Rasmussen et al. | |
| 2004/0183251 | A1 * | 9/2004 | Inoue | 273/143 R |
| 2004/0251625 | A1 * | 12/2004 | Okada | 273/143 R |

(Continued)

*Primary Examiner*—Dmitry Suhol
*Assistant Examiner*—Seng Heng Lim
(74) *Attorney, Agent, or Firm*—K&L Gates, LLP

(57) ABSTRACT

A method and apparatus for a slot machine game with one or more reels and a rotator has stepper motors to randomly drive the stepper motors in accord with a programmed central processing unit. At least one of the stepper motors is relocated from the belly box to the top box to provide a drive for a rotator in the top box. The stepper motor in the top box is reoriented so that its shaft is normal to a front glass over the top box. A pointer can be placed on the end of the shaft to randomly rotate.

27 Claims, 8 Drawing Sheets

U.S. PATENT DOCUMENTS

2005/0026678 A1* 2/2005 Kaminkow .................. 463/20
2005/0054428 A1* 3/2005 Nordman et al. .............. 463/25
2005/0054449 A1* 3/2005 Kopera et al. ................. 463/46
2005/0056996 A1* 3/2005 Nordman ................ 273/143 R
2005/0176492 A1 8/2005 Pierce

* cited by examiner

METHOD AND SYSTEM FOR CONVERTING A SLOT MACHINE

PRIORITY CLAIM

This is a continuation of application number 10/611,794 filed Jun. 30, 2003 now U.S. Pat. No. 6,896,260.

CROSS-REFERENCE TO RELATED APPLICATIONS

Design patent application Ser. No. 10/611,794 of same applicant filed on the same date as this application and entitled, "REEL SLOT MACHINE WITH ROTATOR.

STATEMENT REGARDING FEDERALLY SPONSORED RESEARCH

Not Applicable

SEQUENCE LISTING

Not Applicable

BACKGROUND OF THE INVENTION

A slot machine having a game with a rotator and one or more reels. Slot machines have three or more reels for playing one or more games. Spinners have been added atop conventional three reel or more than three reel slot machines to add an additional and different bonus game. So when three reels align in a preset arrangement of symbols, the player enters into the different bonus game that is not the standard game in that a bonus payout is given and that is independent of the underlying or standard base game. Players love the bonus game and will often continue play on the base game to achieve bonus game play and its payout.

Thus, frequency of bonus game play is important to the players because there is different play and usually an added payout. The anticipation of bonus game play keeps players at the repetitive standard base game play and insures that the casino operator makes more money. Even though the player does not have to insert coins to play the bonus game the casino operator makes more on the standard base game to fund the bonus game. The complexity of the bonus games have increased to the point wherein multiple levels of bonus game play has been added to insure that the player is not bored with either the standard base game or the bonus game. The anticipation of a bonus game and surprise of the difference in play of the bonus game is very important to maintain the players' interest and players' continued play. Numerous different bonus games have been added to the standard base games and some are more successful than others. Notably the "Wheel Of Fortune" bonus game is currently a most popular bonus game as it includes the spinning wheel of the television game show a top the base game. When the preset reel symbols alignment is achieved on the base game the bonus game begins with music and the rotation of the wheel to determine the bonus game payout. Different payouts are possible including additional amounts or multiples of that won in the base game.

Many reel slot machines without any bonus game were made and played for years before the bonus games were introduced and these machines have been replaced and sometimes updated at great expense with bonus games. Specifically, additional software and hardware have been added in the updating of the ubiquitous reel type slot machines to include the bonus games a top the base games. Also, video slot machines have virtual reels to simulate reel type slot play and while video machines are frequently updated by software changes the process is costly. If a bonus game is added to a video slot machine a new or another processing might be required to include the bonus game.

There remains a need to provide the player with a simple slot machine that has an anticipatory feature for the base game to retain player's interest and overcome boredom. There is a demand for a simple and cost effect way to update existing slot machines of the reel type with an anticipatory feature for the base game. Slot machine manufacturers have not met a requirement for a new looking and different playing base game, even though many variations of slot machine dress have been tried. Theme machines based upon familiar parlor games or television shows are currently popular and successful with those game even less payout to the player and return to the operator is of necessity because the owner of the intellectual property rights in the theme must get a share of the slot machine return. While theme machines remain very attractive to the player over time, those are not the best games to play.

SUMMARY OF THE INVENTION

A slot machine with a game has at least one reel and a rotator located separate from the at least one reel. The slot machine has only one game played by a player for a wager. The slot machine includes a cabinet with a hollow space therein including a belly box and a top box there above. A door on the cabinet encloses the belly box, the door has at least one window with a pay line for observation of the position of the at least one reel by the player during play. A top box front glass and a rotator display backboard cover the top box hollow space. The top box front glass and the rotator display backboard are set to face the player. Indicia on the top box front glass and the rotator display backboard help play of the rotator.

A payout meter is visible on the door to show if the player has won a payout for the wager. At least one reel mounts within the belly box and the at least one reel has symbols on a reel strip on the periphery thereof. The at least one reel is driven randomly to spin and stop for positioning one of its symbols on each of the at least one reel in, near or away from the window pay line when the reel stops. The at least one reel mounts on an axis substantially parallel to the window pay line. A rotator is supported in the top box behind the top box front glass and the rotator display backboard and apart from the window. The rotator is mounted to be rotated upon a shaft located substantially normal to the top box front glass and the rotator display backboard. The rotator is set to finish rotating after the at least one reel spins so that the rotator provides an anticipatory feature to the reel play afforded to the player during play of the game.

A central processing unit is programmed with the game for the wager. The central processing unit connects to the at least one reel to drive it randomly so that the at least one reel spins about its axis and stops before any other of the at least one reels stop. The central processing unit independently couples to the rotator so that the rotator stops rotating on its shaft after the last of the at least one reels stop. The central processing unit connects to the payout meter to show if the player has won on reel and rotator play.

A slot machine with a game includes a plurality of reels for spinning and a rotator located separate from the plurality of reels. The rotator is for rotating. The slot machine with one game including the plurality of reels and the rotator has a plurality of reels is mounted to be spun in the slot machine for the player in response to a wager. Each of the plurality of reels begins spinning together but finish spinning in sequence for the outcome of the reel play. A rotator on the slot machine is positioned apart from the plurality of reels. The rotator faces the player and rotates together with the spinning of the plurality of reels. The rotator is controlled to finish rotating subsequent to the ending of the spinning sequence of the plurality of reels and after the reel play.

A central processing unit in the slot machine couples to the plurality of reels and connects to the rotator. The central processing unit is for spinning each of the plurality of reels in randomly in sequence and for finishing the spinning in sequence of the plurality of reels. The central processing unit connects to the rotator for beginning its rotation randomly with the spinning of the plurality of reels and the central processing unit is connected to finish the rotation of the rotator after the plurality of reels so that an anticipatory feature is added to the plurality of reels by the continued rotation of the rotator.

A slot machine with a game has a plurality of reels and a rotator located separate from the plurality of reels. Slot machines are played for a wager. A slot machine cabinet has a hollow space including a belly box and a top box. A plurality of reels is mounted in the belly box. A door covers the belly box and the door has a window. The plurality of reels has symbols about the periphery of each. The plurality of reels is mounted for driven random spinning during game play. The plurality of each reels are each mounted to spin about its axis and each axis set in line with each other so they are substantially parallel to the window. The symbols on the reels are visible through the window and may be aligned randomly with a pay line. The plurality of reels is mounted within the hollow space and driven randomly to spin to position a symbol on the periphery of each reel in, near or away from the window pay line when each reel stops.

A rotator is supported in the top box and the rotator is set to finish rotating after each of the plurality of reels stop spinning randomly so that the rotator provides an anticipatory feature to the reel play afforded to the player during play of the game. A shaft is for the rotator about which the rotator rotates. The shaft is positioned generally normal to each axis of the plurality of reels. A bracket is for mounting within the top box to locate the rotator so that its shaft is positioned substantially normal to the axis of the spinning plurality of the reels during play. A pointer mounted to the shaft and visible for play, the pointer rotated randomly by the rotator during play. A glass covering the top box and the pointer has indicia facing outwardly of the top box for observation by the player. Indicia are for random alignment with the pointer.

A central processing unit is connected to each of the plurality of reels to drive them randomly so that each of the plurality of reels spins about its axis. The central processing unit is programmed to stop the spinning of each of the plurality of reels in sequence. The central processing unit independently couples to the rotator so that the rotator rotates when the plurality of reels spin but the rotator finishes rotating after the plurality of reels has in sequence stopped spinning. A stepper motor is provided to spin each of the plurality of reels and a stepper motor is located in the top box for the rotator. Each of the stepper motors couples to the central processing unit. The stepper motors for the plurality of reels carries a reel strip support and a reel strip with symbols. The stepper motor for the rotator carries a pointer carrier that is positioned in the top box facing the glass for observation by the player during play.

An extension harness couples between the central processing unit and the stepper motor for the rotator in the top box. A light harness couples the central processing unit and lamps mounted inside the top box. The lamps are for backlighting indicia in the top box during play. The glass includes a front glass over the pointer and with indicia and a rotator display backboard positioned in the top box behind the front glass so that the pointer is securely positioned there between. The rotator display backboard may also have indicia.

A method converts a slot machine with a game including a plurality of reels to the game with the plurality of reels and a rotator located separate from the plurality of reels. The slot machine has the game played by a player for a wager. A slot machine cabinet has a hollow space with a belly box and a top box. A plurality of reels mounts within the belly box with a door there over. The door has a window and the plurality of reels have symbols about the periphery of each. The plurality of reels is mounted for driven random spinning during game play. Each of the plurality of reels is mounted to spin about its axis and each axis set in line with another and is substantially parallel to the window so that symbols on the reels are visible through the window and may be aligned randomly with a pay line. The plurality of reels is mounted within the hollow space and driven randomly to spin to position a symbol on the periphery of each reel in, near or away from the window pay line when each of the plurality of reels stops.

A central processing unit connects to each of the plurality of reels to drive them randomly so that each of the plurality of reels spins about its axis. The central processing unit is programmed to stop the spinning of each of the plurality of reels in sequence. The central processing unit independently couples to the rotator so that the rotator rotates when the plurality of reels rotate but the rotator finishes rotating after the plurality of reels have in sequence stopped spinning. A stepper motor is used to spin each of the plurality of reels and to rotate the rotator. Each of the stepper motors coupled to the central processing unit. The stepper motors for the plurality of reels carries a reel strip support and a reel strip with symbols. The stepper motor for the rotator carrying a pointer carrier positioned in the top box facing the glass for observation by the player during play. The method has the steps of reorienting one of the stepper motors of the plurality of reels from the belly box to the top box to provide the rotator supported in the top box. The rotator is set to finish rotating after each of the plurality of reels stop spinning randomly so that the rotator provides an anticipatory feature to the reel play afforded to the player during play of the game. Another step of the method is orienting a shaft for the rotator about which the rotator rotates in position generally normal to each axis of the plurality of reels. Mounting a bracket within the top box to locate the rotator so that its shaft is positioned substantially normal to the axis of the spinning plurality of the reels during play is a step. The step of carrying a pointer on the shaft and visible for play is followed so the pointer rotates randomly during play. The method has the step of covering the top box and the pointer with a glass with indicia facing outwardly of the top box for observation by the player and indicia set for random alignment with the pointer. Then the step of coupling the reoriented stepper motor to the central processing unit with an extension harness is followed.

DETAILED DESCRIPTION

Figure 1:
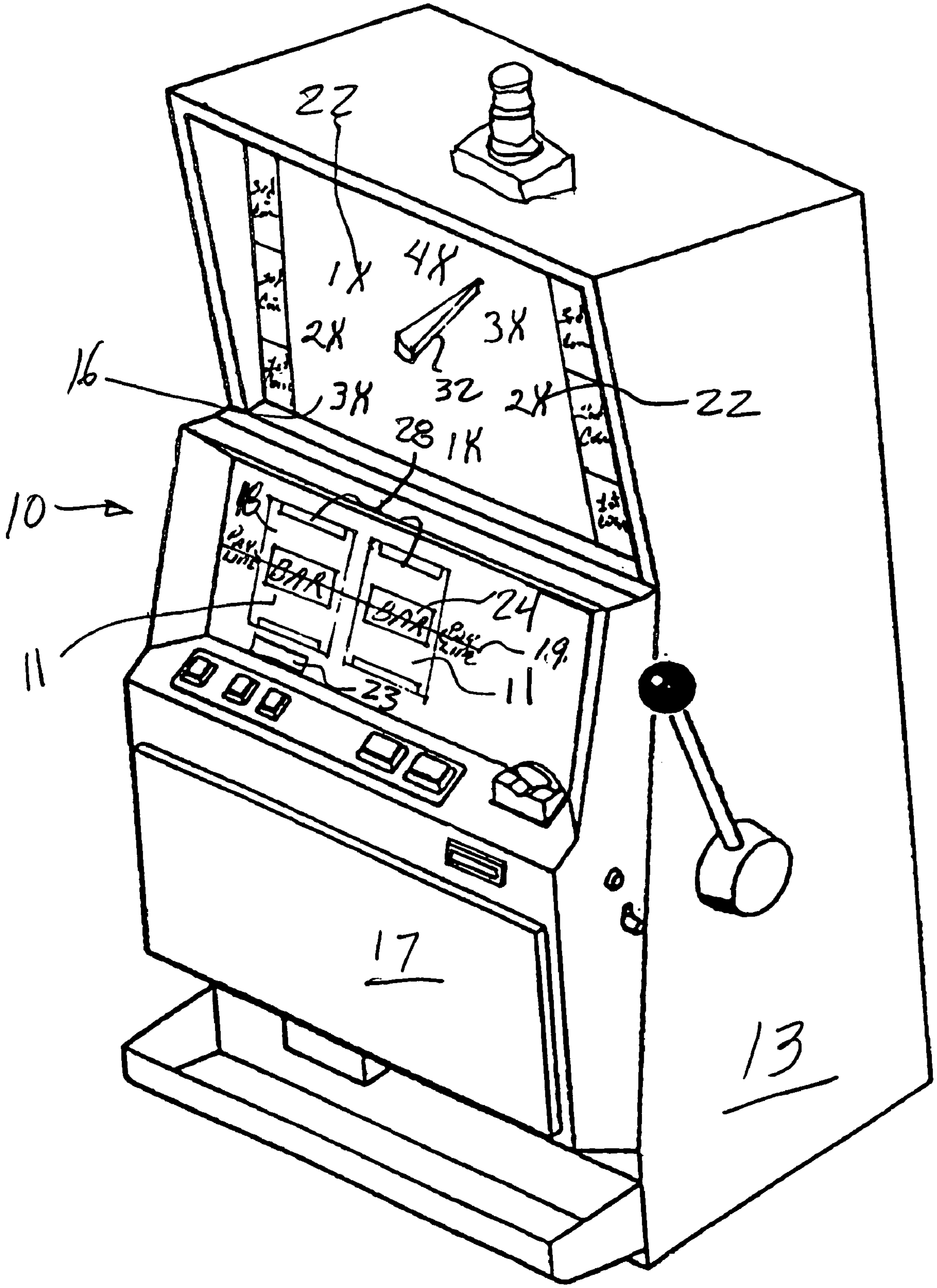
FIG. 1 is a slot machine with a reel type game shown in perspective and including a rotator separate from the reels to provide an anticipatory feature to the player during play of a game.
Figure 2:
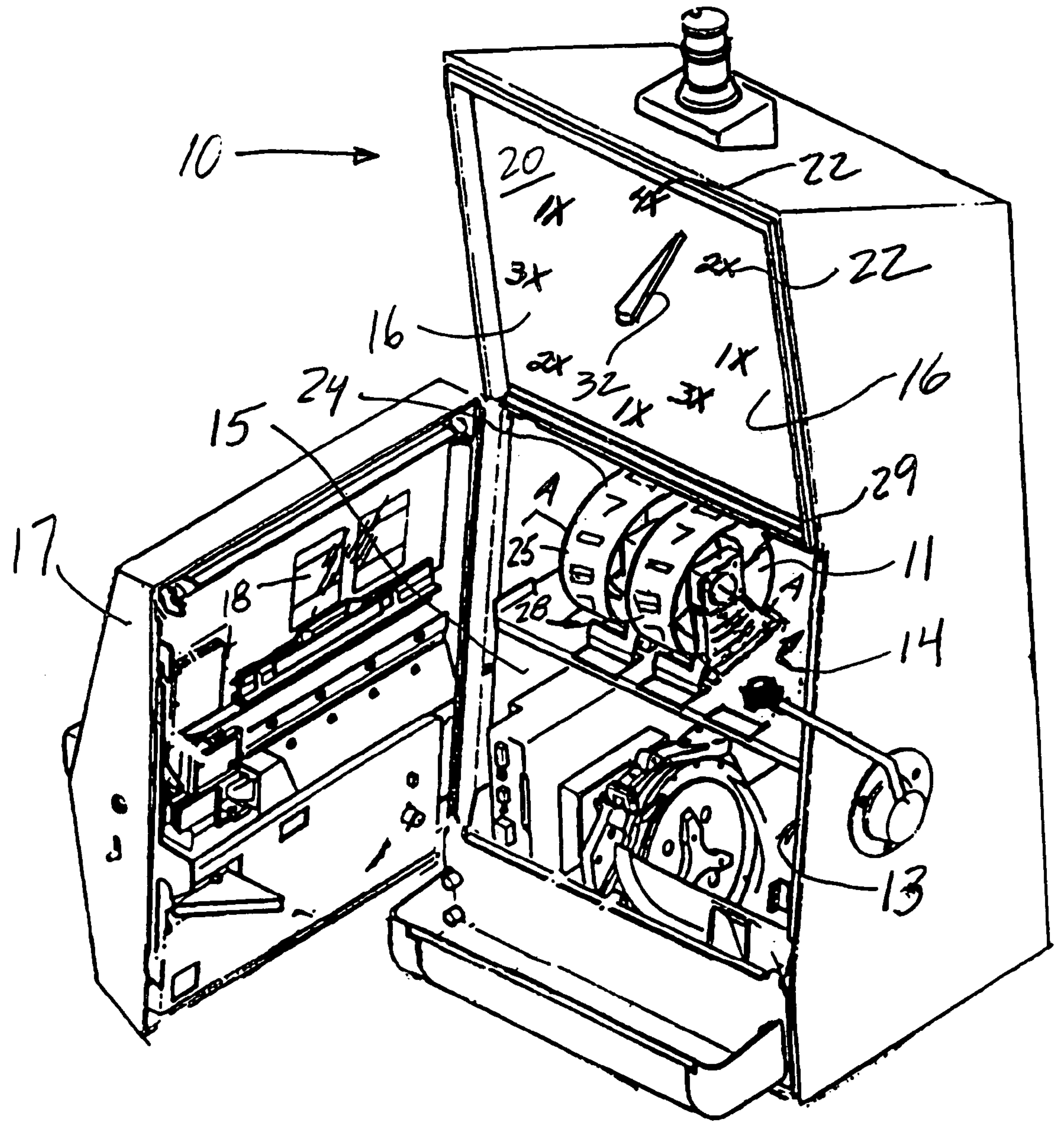
FIG. 2 is the slot machine of FIG. 1 with the door open to show the reel type game and the rotator separate from the reels as they are positioned within a cabinet.

A slot machine 10 with a game has at least one reel 11 and a rotator 12 located separate from the at least one reel 11 in FIGS. 1 and 2. Slot machine 10 has only one game played by a player for a wager. Slot machine 10 includes a cabinet 13 with a hollow space 14 therein including a belly box 15 and a top box 16 there above. A door 17 on the cabinet 13 encloses belly box 15; door 17 has at least one window 18 with a pay line 19 for observation of the position of the at least one reel 11 by the player during play. A top box 16 front glass 20 and rotator 12 display backboard cover top box 16. Top box 16 front glass 20 and rotator 12 display backboard 21 are set in FIG. 4 to face the player. Indicia 22 on top box 16 front glass 20 and rotator 12 display backboard 21 help with the rotator 12.

Figure 4:
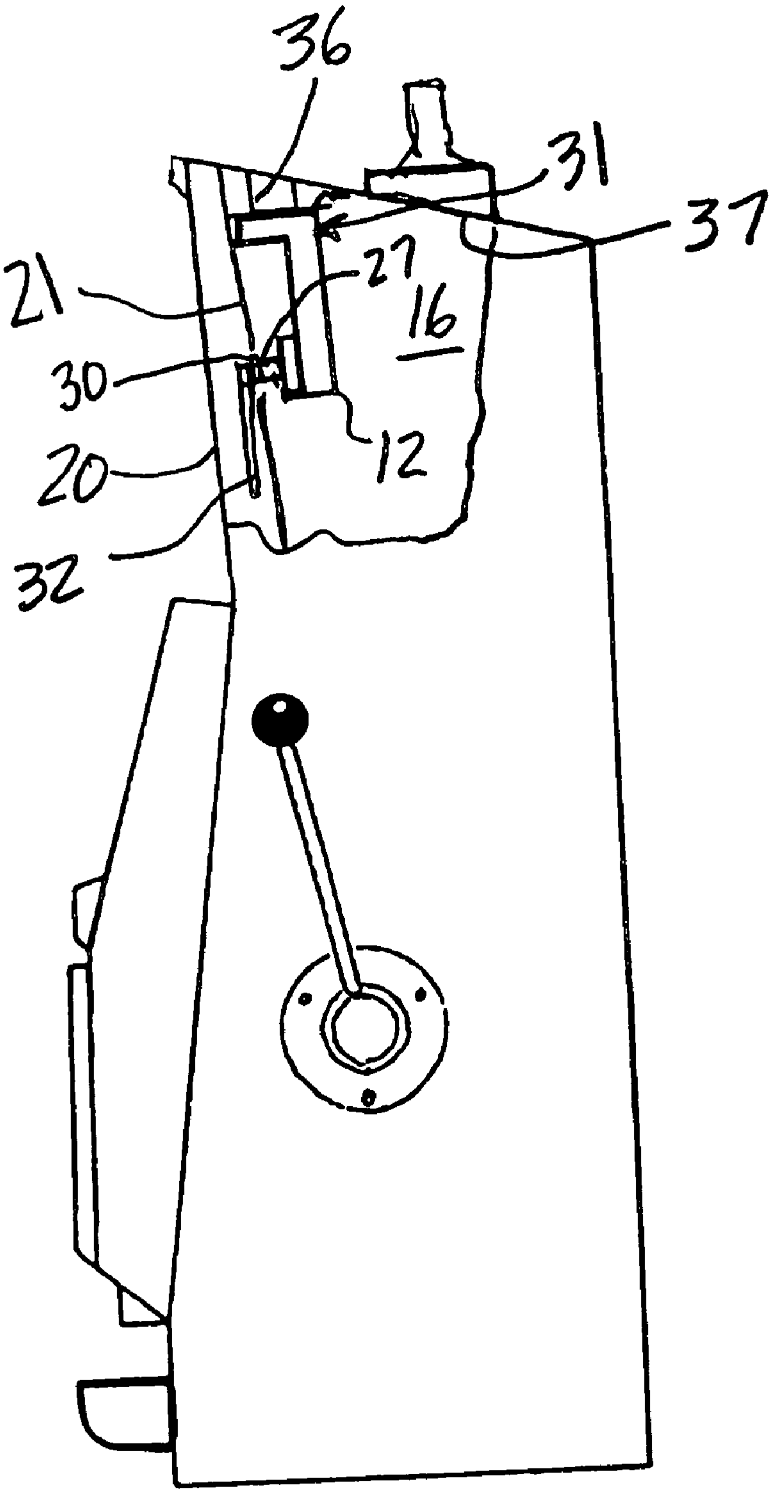
FIG. 4 is a side view of the slot machine of FIG. 1 showing in partial section how the rotator is mounted to the top inside of the cabinet.

A payout meter 23 is visible on door 17 in FIG. 1 to show if the player has won a payout for the wager. At least one reel 11 mounts within belly box 15 and the at least one reel 11 has symbols 24 on a reel strip 25 on the periphery thereof in FIGS. 1 and 2. The at least one reel 11 is driven randomly to spin and stop for positioning one of its symbols 24 on each of the at least one reel 11 in, near or away from window 18 pay line 19 when the reel stops. The at least one reel 11 mounts on an axis A-A in FIG. 2 substantially parallel to window 18 pay line 19 as shown when door 17 is dosed as in FIG. 1. Rotator 12 is supported in top box 16 behind top box 16 front glass 20 and rotator 12 display backboard 21 and apart from window 18. FIG. 4 has rotator 12 mounted to rotate a shaft 27 located substantially normal to top box 16 front glass 20 and rotator 12 display backboard 21. The rotator 12 is set to finish rotating after the at least one reel 11 spins so that the rotator 12 provides an anticipatory feature to the reel play afforded to the player during play of the game.

Figure 3:
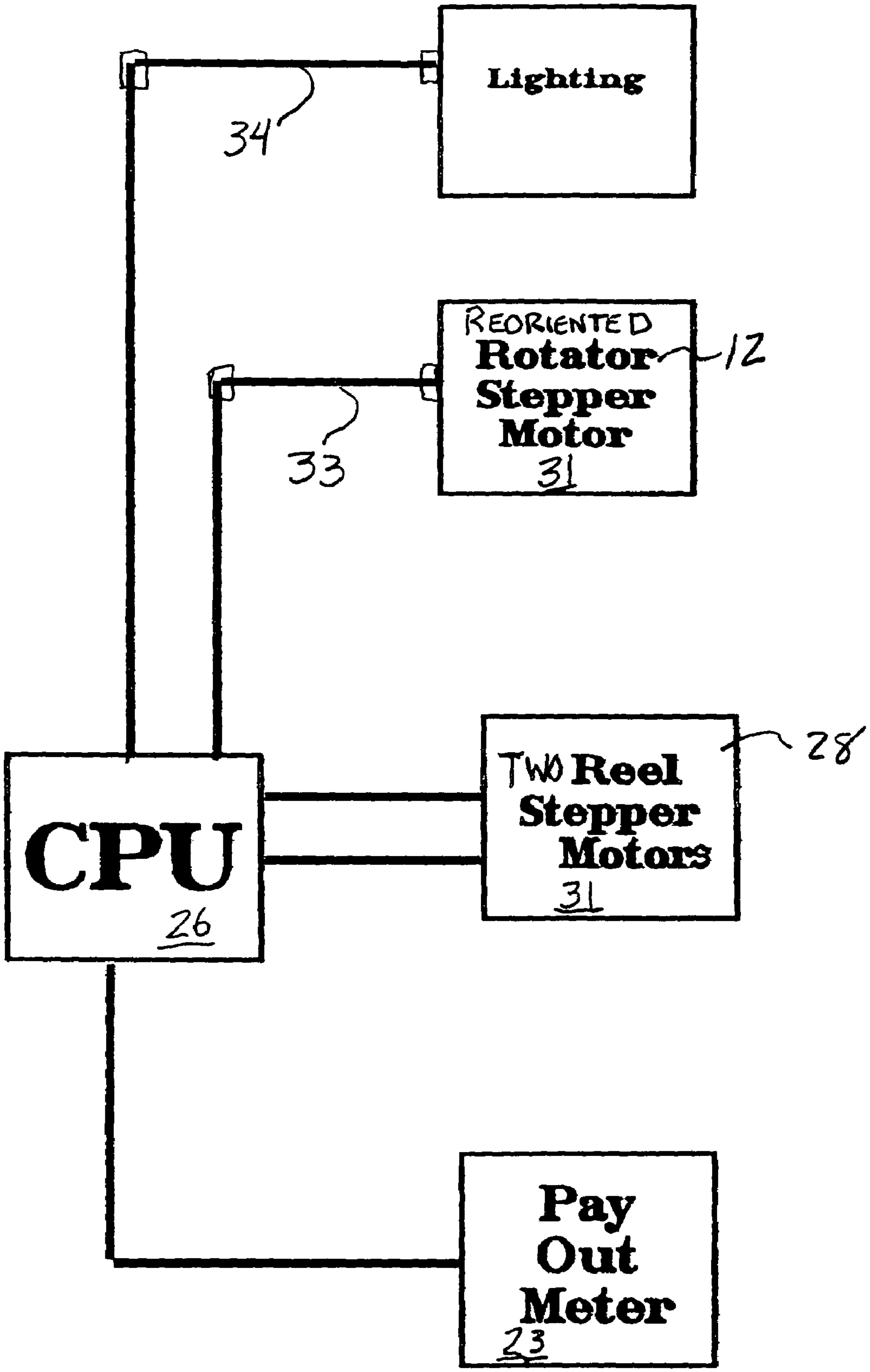
FIG. 3 is a block diagram to illustrate how simply existing slot machines maybe modified to run a game on the reels and the rotator.

A central processing unit 26 shown in a block diagram of FIG. 3 is programmed with the game for the wager. Central processing unit 26 connects to the at least one reel 11 to drive it randomly so that the at least one reel 11 spins about its axis A-A and stops before any other of the at least one reels 11 stop. Central processing unit 26 independently couples to the rotator 12 so that the rotator 12 stops rotating on its shaft 27 after the last of the at least one reels stop. Central processing unit 26 connects to payout meter 23 to show if the player has won on reel 11 and rotator 12 play.

Slot machine 10 with a game may include a plurality of reels 28 as shown in FIGS. 1, 2 and 3 for spinning and rotator 12 located separate from the plurality of reels 28. The rotator 12 is for rotating. The slot machine 10 with one game including the plurality of reels 28 and the rotator 12 has the plurality of reels 28 is mounted to be spun in the slot machine 10 for the player in response to a wager. Each of the plurality of reels 28 begins spinning together but finish spinning in sequence for the outcome of the reel play. Rotator 12 on the slot machine 10 is positioned apart from the plurality of reels 28. The rotator 12 faces the player and rotates together with the spinning of the plurality of reels 28. The rotator 12 is controlled to finish rotating subsequent to the ending of the spinning sequence of the plurality of reels 28 and after the reel play.

Central processing unit 26 in the slot machine 10 couples to the plurality of reels 28 and connects to the rotator 12. Central processing unit 26 is for spinning each of the plurality of reels 28 in randomly in sequence and for finishing the spinning in sequence of the plurality of reels 28 in FIGS. 1, 2 and 3. Central processing unit 26 connects to the rotator 12 for beginning its rotation randomly with the spinning of the plurality of reels 28 and central processing unit 26 is connected to finish the rotation of the rotator 12 after the plurality of reels 28 so that an anticipatory feature is added to the plurality of reels 28 by the continued rotation of the rotator 12.

Slot machine 10 with a game has the plurality of reels 28 and rotator 12 located separate from the plurality of reels 28. The slot machine 10 is played for a wager. Slot machine 10 cabinet 13 has hollow space 14 including belly box 15 and top box 16. The plurality of reels 28 is mounted in belly box 15. Door 17 covers belly box 15 and door 17 has window 18. The plurality of reels 28 has symbols 24 about the periphery of each. The plurality of reels 28 is mounted for driven random spinning during game play. The plurality of each reels 28 are each mounted to spin about its axis A-A and each axis A-A set in line with each other so they are substantially parallel to window 18 see FIG. 2. Symbols 24 on the reels are visible through window 18 and may be aligned randomly with pay line 19. The plurality of reels 28 is mounted within hollow space 14 and driven randomly to spin to position a symbol on the periphery of each reel in, near or away from window 18 pay line 19 when each reel stops depicted in FIG. 1.

Figure 5:
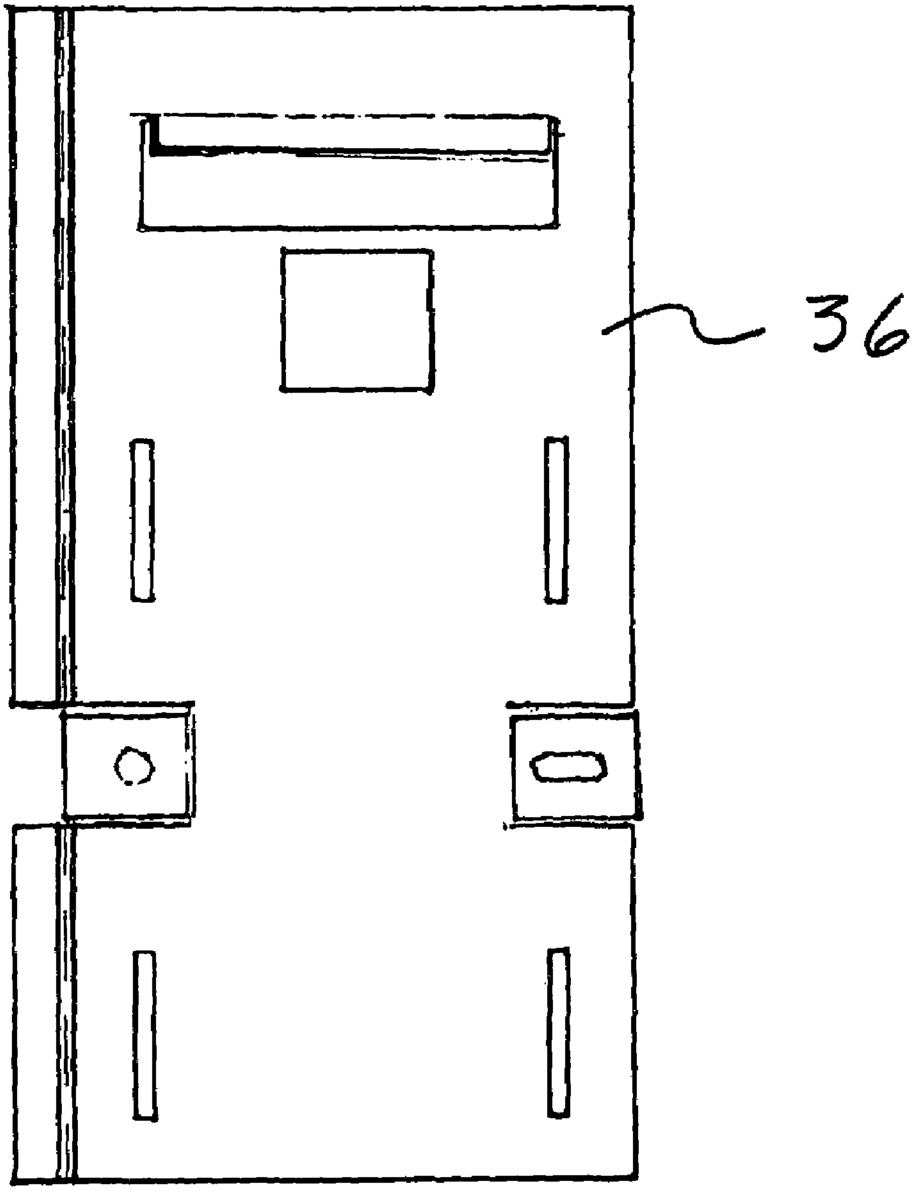
FIG. 5 is a plan view of the bracket for mounting the rotator to the top inside wall of the cabinet for the slot machine of FIG. 1.
Figure 7:
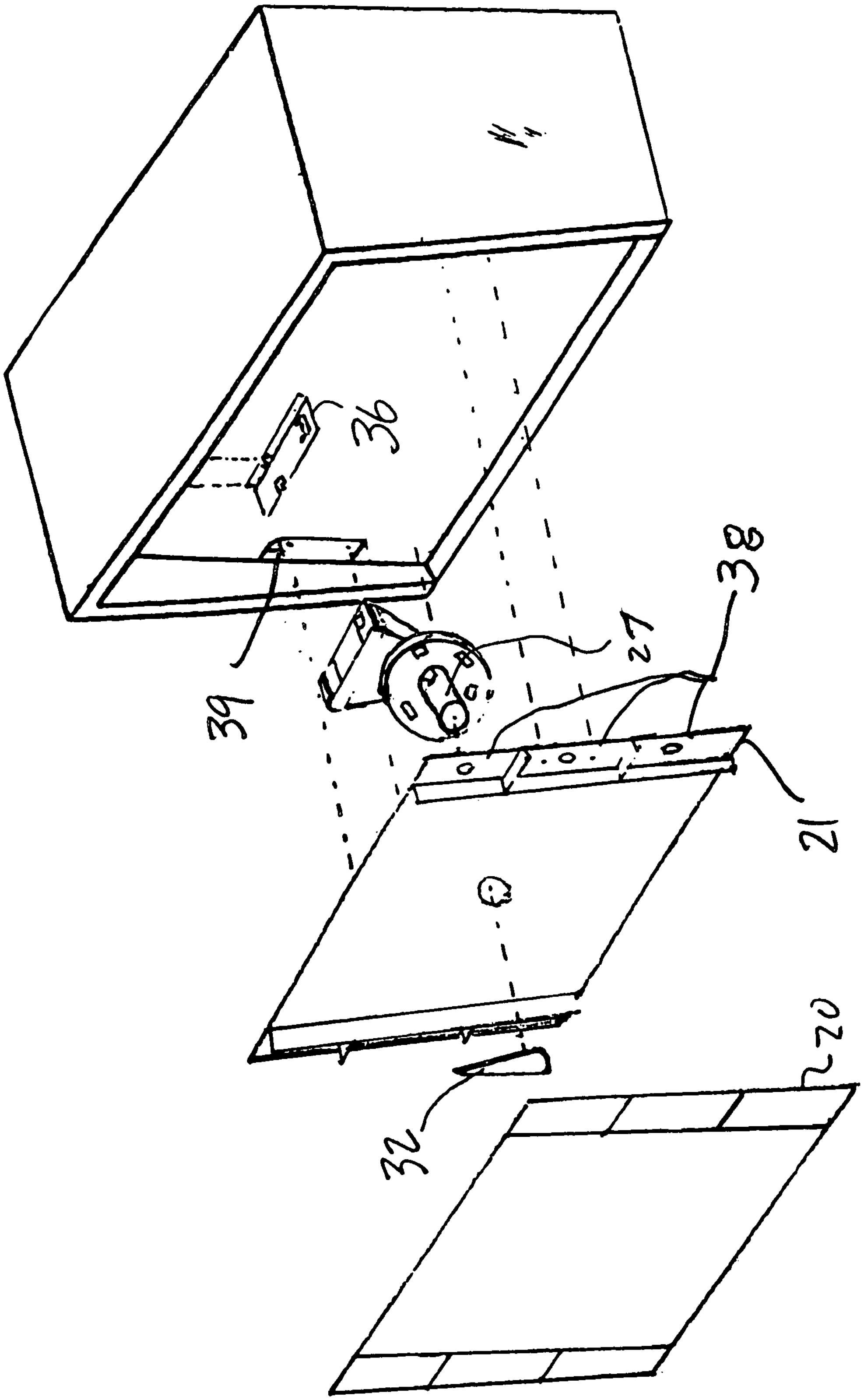
FIG. 7 is an exploded view of the reoriented stepper motor for the top box.

Rotator 12 is supported in top box 16 as shown in FIG. 4 and the rotator 12 is set to finish rotating after each of the plurality of reels 28 stop spinning randomly so that the rotator 12 provides an anticipatory feature to the reel play afforded to the player during play of the game. Shaft 27 is for the rotator 12 about which the rotator 12 rotates. Shaft 27 is positioned generally normal to each axis A-A of the plurality of reels 28. A bracket 36 in FIGS. 4, 5 and 7 is for mounting within top box 16 to locate the rotator 12 so that its shaft 27 is positioned substantially normal to axis A-A of the spinning plurality of the reels during play. A pointer 32 mounts to shaft 27 and is visible for play. Pointer 32 is during play rotated randomly by the rotator 12. A top box 16 front glass 20 covers and pointer 32 and has indicia 22 facing outwardly of top box 16 for observation by the player. Indicia 22 are for random alignment with the pointer 32 as best seen in FIG. 2.

Central processing unit 26 is connected to each of the plurality of reels 28 to drive them randomly so that each of the plurality of reels 28 spins about its axis A-A. Central processing unit 26 is programmed to stop the spinning of each of the plurality of reels 28 in sequence. Central processing unit 26 independently couples to rotator 12 as shown in FIG. 3 so that rotator 12 rotates when the plurality of reels 28 spin but rotator 12 finishes rotating after the plurality of reels 28 has in sequence stopped spinning. A stepper motor 31 is provided to spin each of the plurality of reels 28 and stepper motor 31 is located in top box 16 for rotator 12. Each of the stepper motors 31 couples to central processing unit 26 in FIG. 3. Stepper motors 31 for the plurality of reels 28 include reel strip 25, support 29 and reel strip 25 has symbols 24 in FIG.

2. Stepper motor 31 for rotator 12 carries pointer 32 on carrier 30 positioned in top box 16 facing top box 16 front glass 20 and rotator 12 display backboard 21 for observation by the player during play, see FIG. 4. Stepper motor 31 is obtainable from Minnebea as part number 23LM-K255-02 and is made in Thailand for the International Game Technology conversion described later in this disclosure. Stepper motors 31 have been used and controlled by central processing units 26 for twenty years in the slot machine manufacturing industry so their operation is well know and will not be described since there is no change in the operation of the stepper motor 31 or its control by central processing unit 26.

Figure 6:
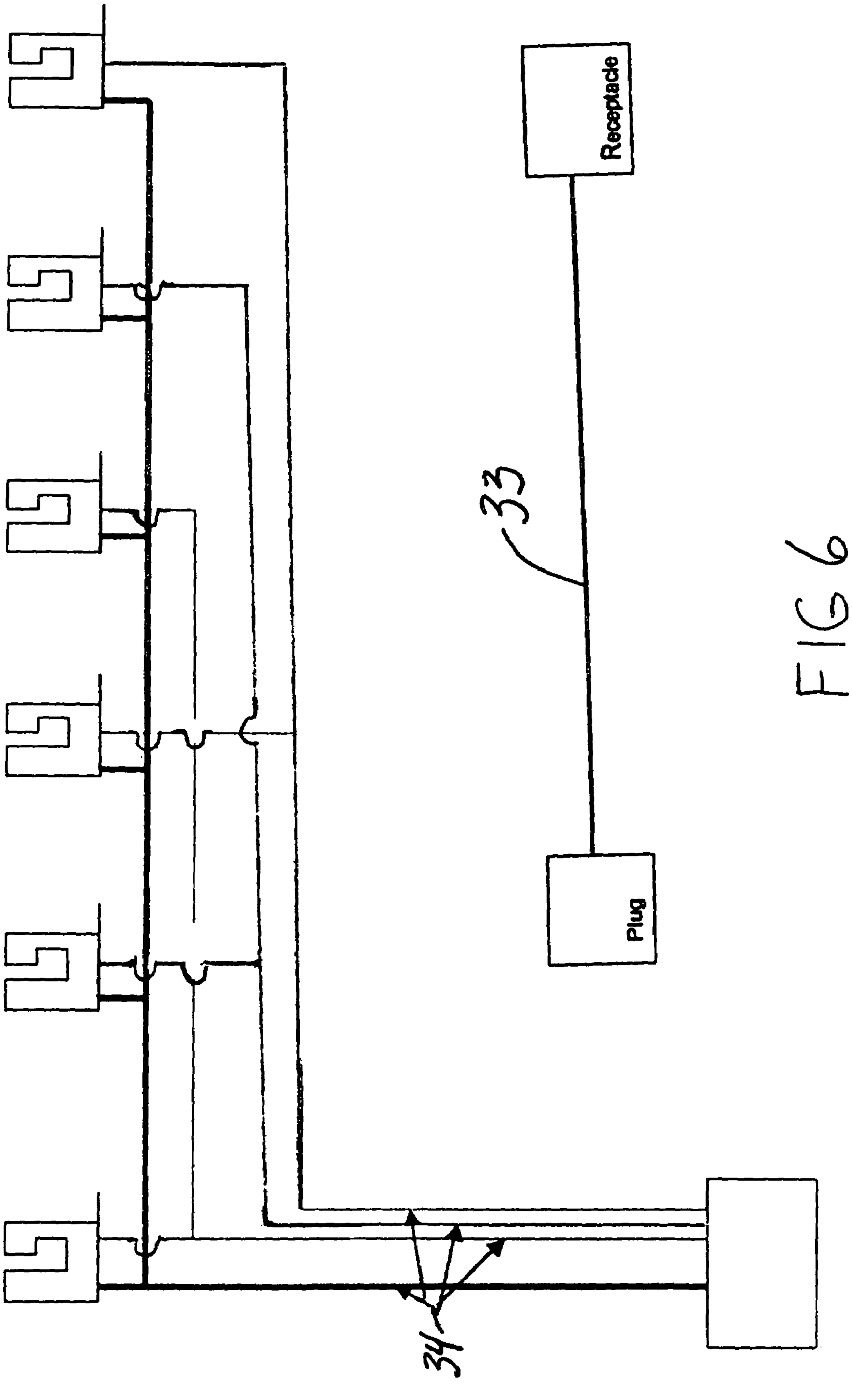
FIG. 6 are wire harnesses used to make the connection to the rotator and to relocate lighting in the top box of the slot machine of FIG. 1.

An extension harness 33 in FIGS. 3 and 6 couples between central processing unit 26 and stepper motor 31 for the rotator 12 in top box 16. A light harness 34 in FIGS. 3 and 6 couples central processing unit 26 for lamps mounted through display backboard 21. Lamps 35 are for backlighting indicia 22 in top box 16 during play. Top box 16 front glass 20 and covers pointer 32 and with indicia 22 and rotator 12 display backboard 21 is positioned in top box 16 behind top box 16 front glass 20 so that pointer 32 is securely positioned there between. Rotator 12 display backboard 21 may also have indicia 22 in FIG. 4.

A method converts slot machine 10 with a game including plurality of reels 28 to the game with plurality of reels 28 and rotator 12 located separate from plurality of reels 28 in FIGS. 1 and 2. Slot machine 10 has the game played by a player for a wager. Slot machine 10 includes cabinet 13 having hollow space 14 with therein belly box 15 and top box 16. Plurality of reels 28 mounts within belly box 15 with door 17 there over. Door 17 has window 18 and plurality of reels 28 have symbols 24 about the periphery of each. Plurality of reels 28 is mounted for driven random spinning during game play. Each of the plurality of reels 28 is mounted to spin about its axis A-A and each axis A-A set in line with another and is substantially parallel to window 18 so that symbols 24 on the reels are visible through window 18 and may be aligned randomly with pay line 19 as shown in FIG. 1. Plurality of reels 28 is mounted within hollow space 14 and driven randomly to spin to position a symbol 24 on the periphery of each of the plurality of reels 28 in, near or away from window 18 pay line 19 when each of the plurality of reels 28 stops.

Central processing unit 26 connects to each of the plurality of reels 28 to drive them randomly so that each of the plurality of reels 28 spins about its axis A-A. Central processing unit 26 is programmed to stop the spinning of each of the plurality of reels 28 in sequence. Central processing unit 26 independently couples to rotator 12 so that rotator 12 rotates when the plurality of reels 28 rotate but rotator 12 finishes rotating after the plurality of reels 28 have in sequence stopped spinning in FIG. 3. Stepper motor 31 is used to spin each of the plurality of reels 28 and to rotate rotator 12. Each of the stepper motors 31 coupled to central processing unit 26. Stepper motors 31 for the plurality of reels 28 carries reel strip 25, support 29 and reel strip 25 that has symbols 24. Stepper motor 31 for rotator 12 carries pointer 32 on carrier 30 positioned in top box 16 facing outwardly from top box 16 front glass 20 and rotator 12 display backboard 21 for observation by the player during play as shown in FIGS. 1, 2 and 4. The method has the steps of reorienting one of the stepper motors 31 of the plurality of reels 28 from belly box 15 to top box 16 to provide rotator 12 supported in top box 16. Rotator 12 is set to finish rotating after each of the plurality of reels 28 stop spinning randomly so that rotator 12 provides an anticipatory feature to the reel play afforded to the player during play of the game. Another step of the method is orienting shaft 27 for rotator 12 for rotation in position generally normal to each axis A-A of the plurality of reels 28. Mounting bracket 36 within top box 16 in FIG. 7 to locate the rotator 12 so that its shaft 27 is positioned substantially normal to the axis A-A of the spinning plurality of the reels 28 during play is a step. The step of carrying pointer 32 on shaft 27 in FIG. 4 so it is visible for play is followed. Pointer 32 rotates randomly during play. The method has the step of covering top box 16 and pointer 32 with front glass 20 with indicia 22 on display backboard 21 facing outwardly of top box 16 for observation by the player and indicia 22 is set for random alignment with pointer 32. Then the step of coupling the reoriented stepper motor 31 to central processing unit 26 with extension harness 33 is followed as shown in FIGS. 3 and 6.

Figure 8:
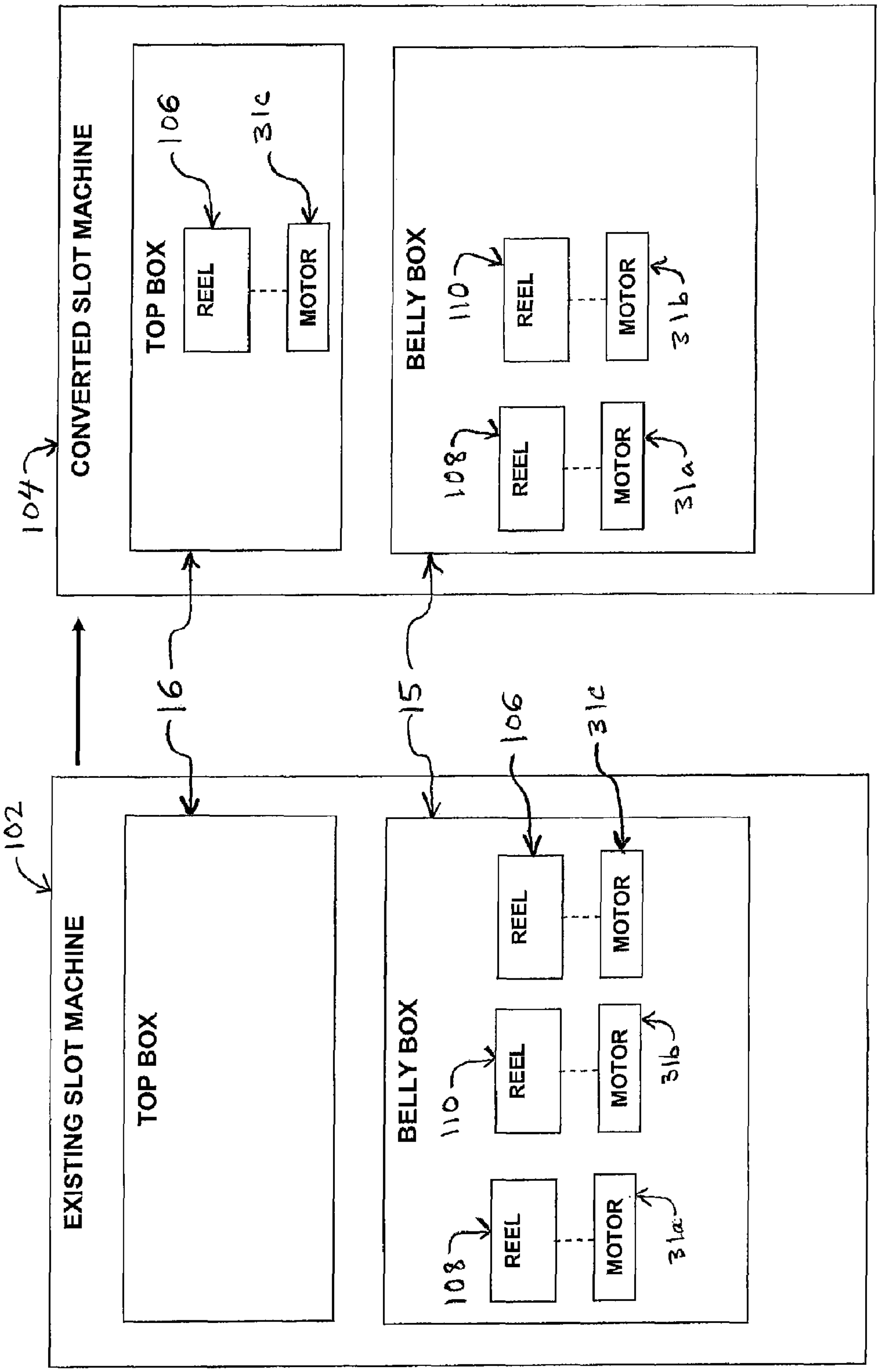
FIG. 8 is a block diagram which schematically illustrates one embodiment of an existing slot machine and its converted form as a converted slot machine.

Referring to FIG. 8, the conversion of existing slot machines (such as existing slot machine 102) to a converted slot machine 104 includes starting with a commercial three-reel machine such as will described wherein one stepper motor 31*c* formerly driving a reel 106 is moved and reoriented so its shaft 27 is set normal to its former position parallel to door 17. Thus the moved reel stepper motor 31*c* becomes a part of rotator 12 disposed in top box 16 see FIGS. 4 and 8. Two reels 108 and 110 (associated with motors 31*a* and 31*b*, respectively) remain in belly box 15 and appear as they normally do adjacent to one another, side by side such that their reels and their associated symbols 24 are set for alignment randomly during play. The belly box window 18 is altered to cover the hollow space 14 formerly occupied by the moved third reel stepper motor 31*c* see FIG. 1.

Merely moving the third reel stepper motor 31*c* and reorienting its shaft 27 is insufficient to convert the slot machine 10 or 102, as the third reel 106, reel strip 25 with symbols 24 would, after moving and reorienting, no longer be positioned for observation and play. Specifically, reel strip 25, support 29 are removed and shaft 27 thereof now carries carrier 30 and pointer 32 visible in top box 16 see FIGS. 4 and 8. Top box 16 front glass 20 and rotator 12 display backboard 21 are redesigned to include indicia 22 different from symbols 24 on the reel or reels 108 and 110 remaining in belly box 15. Play of the reoriented stepper motor 31*c* in top box 16 is different from that of the reel or reels 108 and 110 in the belly box 15 even though game, the central processing unit 26 and its programming remain the same. In particular there are at least two significant differences. The position and operation of the reoriented stepper motor 31*c* in top box 16 and its indicia 22 are different. That change suggests a different game and mode of play but there has been no change because the software that controls the reoriented stepper motor 31*c* in top box 16 has not been altered. The importance of that will be explained in this disclosure.

The typical ubiquitous slot machines for conversion could be selected from an International Game Technologies Model S Plus with an 80c32 Intel Model S 2000 computer chip or I 960 computer chip or Bally Model 5500 Pro running a MPU as-3356-201 or a Model S 6000 or Sigma SG 150 SG 300 Universal 8088 Intel computer chip. Insofar as those computer chips are concerned in the identified equipment, the conversion described herein operates the same way; that is the instructions of the computer chip remain unaltered and drive the stepper motors 31 in the same way to provide one game. The difference is primarily appearance of the game to the player giving a heightened expectation and thus more enjoyment with the included anticipatory feature of the rotator 12 in top box 16.

Bracket 36 shown in plan in FIG. 5 is used to mount the moved and reoriented third reel in top box 16. Bracket 36 is screwed to top inside wall 37 in FIG. 4 of top box 16 in the center thereof so that moved and reoriented stepper motor 31 and its shaft 27 may be centered within the slot machine 10 top box 16 and located so that pointer 32 mounted on stepper motor 31 shaft 27 aligns with the center of indicia 22 on top box 16 front glass 20 and rotator 12 display backboard 21. As with an ordinary three-reel slot machine the remaining in belly box 15 first, second, third, etc. stepper motors 31 are activated by slot machine 10 central processing unit 26 then first stepper motor 31 comes to a stop after which second stepper motor 31 comes to a stop, the third stepper motor 31 which in the specific example of this disclosure is relocated and reoriented and in top box 16 stops. The player does not know that the rotator 12 includes the relocated and reoriented stepper motor 31 with different indicia 22. The player assumes that the rotator 12 is a new feature and the converted slot machine 10 is considered unique and more enjoyable to play.

Excitement can be further enhanced by the addition of a delay by central processing unit 26 in the operation of the third stepper motor 31 to give the illusion that its operation, i.e. rotator 12 is truly independent of the first and second reels. Moreover and along the same line of logic, audio may be added to the play with particular emphasis on the timing for when sounds are delivered by central processing unit 26 during the game conclusion of the rotation of the rotator 12. Although only one game has been played, the player has the feeling and belief that top box 16 rotator 12 is there to provide a supplementary chance to win. In fact the anticipation has been enhanced with no change in the random operation or results of the basic three-reel game.

Lack of change in the play is particularly important because the regulatory process to achieve approval of any casino game requires that the operation of slot machine 10 be random and the payout be computable and definite. The use of any approved existing game with the type of cosmetic alteration described herein is of great value to the casino operator as it allows the updating and reuse of existing machines in a new and attractive way. Gaming regulators require that the alteration described be verifiable so that the play although seemly different has the same approved return to the player. Since the wiring changes necessary for the conversion and to be explained herein after with reference to FIGS. 3 and 6 are all external to central processing unit 26, the manner of random play of one game has not been changed. Regulatory approval of the conversion is simplified. Old stepper slot machines can be a useful update.

The wiring extension harnesses 33 for the stepper motors 31 and for lighting 34 shown in FIGS. 3 and 6 are designed for connection to the International Game Technology Model S Plus. Extension wiring harnesses similar to 33 and 34 can be fashioned by skilled artisans for any other existing slot machine hardware and software to drive a repositioned and reoriented stepper motor 31. Mentioned herein were several different slot machines from other manufactures that with reference to this disclosure can with knowledge of this disclosure be easily altered to also give the illusion that the specific International Game Technology example described provides without undue effort by a skilled artisan in the slot machine manufacture, assembly or repair.

The method of making the conversion includes opening door 17, turning off the power. Removing all three pieces of existing glass. Removing all three of the reel strips 25 to make a change in symbols 24 for the game but not the manner of random play. Removing the third reel and its stepper motor 31 from belly box 15. Installing a new door signal switch on the right side of cabinet 13 by using a loop line from belly box 15. Installing bracket 36 to mount the relocated and reorient stepper motor 31 for rotator 12 to the inside of top wall 37 in FIG. 4 of top box 16 with an 8×32 nut and screw placed through an existing hole. Sliding in stepper motor 31 into bracket 36 in a central position within top box 16. Position shaft 27 of the stepper motor 31 normal to its former location in belly box 15 of the cabinet 13. Bracket 36 in top box 16 relocates and reorients the stepper motor 31 to become the rotator 12. The reel strip support 29 has been removed and its shaft 27 is perpendicular relative to its former position in belly box 15. Stepper motor 31, shaft 27 has now been relocated to carry the rotator 12 facing the player when the installation is complete.

Stepper motor 31 and bracket 36 depend downwardly from the inside top wall 37 of top box 16 with stepper motor 31 and shaft 27 turned ninety degrees from their former positions in belly box 15 see FIGS. 2 and 4. The rotator 12 will face outwardly toward the player. Installing extension harness 33 from the third reel central processing unit 26 output see FIG. 3 in belly box 15 completes the electrical connection of the relocated and reoriented stepper motor 31. Tying the extension harness 33 with wire ties to position it in top box 16 and belly box 15 away from moving parts and plugging the extension harness 33 into the relocated stepper motor 31 for the rotator 12 completes the simple hook up.

The anticipatory feature is the different look and location of the rotator 12 in top box 16. As explained top box 16 front glass 20 and rotator 12 display backboard 21 have indicia 22 that are different from the symbols 24 of the reels remaining in belly box 15. The illusion of different play is the result. The software in central processing unit 26 remains the same and the random play and pay out for the game has not been changed. The rotator 12 includes indicia 22 mounted to top box 16 on the front glass 20 and rotator 12 display backboard 21 in front of the relocated and reoriented stepper motor 31 which is obscured. Rotation of pointer 32 installed on shaft 27 of the relocated and reoriented stepper motor 31 indicates any indicia 22 achieve during play. This is instead of but exactly the same as the random action of the third reel formally in belly box 15. To complete the conversion the lighting of top box 16 and the three recesses 38 on each side of rotator 12 display backboard 21 shown in FIG. 7 is connected with light harness 34. This illuminates top box 16 front glass 20 that has indicia 22 of the rotator 12. Installing light harness 34 see FIG. 3 by plugging it into rotator 12 display backboard at the three holes on the left and right sides of rotator 12 display backboard 21 is accomplished and installing rotator 12 display backboard 21 with four, 6-32×2 inch screws and nuts into side flanges 39 one is shown in FIG. 7 existing in top box 16 along front inside walls 40 of top box 16.

So that the play of the converted slot machine 10 game seems entirely new, the existing symbols 24 on the remaining reels in belly box 15 have been changed to echo the theme of the converted slot machine 10 game. Skilled artisans know how to position symbols 24 on the reel strips 25 so that the random play remains in accord with the regulatory approved programmed instructions. In particular, the locations of symbols 24 on the reel strips 25 are preset to provide the approved pay and loss frequency and randomness when driven by the central processing unit 26 to meet the range permitted by regulatory mandates of the various jurisdictions in which the slot machine 10 game might be offered. Installing the new two reel strips 25 on support 29 of the belly box 15 stepper motors 31 updates the game. Installing the belly glass and window 18 for the remaining updated two reels provides the required appearance of the two-reel slot machine 10. That is the appearance must harmonize with the theme of the game and rotator 12 to give the uniform image desired to the game. At this time the power can be turned on for checking the pay table to insure that window 18 and reel strip 25 are positioned correctly for play and viewing through the window 18 relative to pay line 19. There is as explained a location for each reel strip 25 to meet the approved game random return. To set up the rotator 12 the technician must cycle the two reel play until pays are indicated for the relocated stepper motor 31 in top box 16 then the installation of pointer 32 on shaft 27 of the relocated and reoriented stepper motor 31 shaft 27 is performed to assure that it faces indicia 22 of the top and lesser awards as shown on rotator 12 display backboard 21. That position indexes the rotator 12 pointer 32 relative to the top box indicia 22. Installing top box 16 front glass 20 and rotator 12 display backboard 21 over and behind pointer 32 finishes the installation see FIG. 4. Closing door 17 completes the conversion. Although not shown, skilled artisans will understand that a disc can be substituted for pointer 32 and markings on the disc can be used to point to indicia 22 or be the indicia if the inside of the front glass 20 and display backboard 21 are changed for showing the results of play.

Central processing unit 26 might include a delay to end the rotation of the rotator 12 an adjustable time period after the sequence of spinning of the reels to thereby enhance the anticipatory feature. Thus the player of the game has the experience of watching the spinning reels end their spinning in sequence after which central processing unit 26 ends the rotation of the rotator 12 to provide a greater illusion of the rotator 12 being more that just part of the one game of the slot machine 10. Slot machine 10 can as explained have an audio system in central processing unit 26 to signal with sound payout meter 23 results. In that way the player will first watch the reels end in sequence, shift gaze to the rotator 12 in top box 16 and then hear audio announce the winning results. All of this is from a simple conversion of a reel slot machine with but one game. The enhanced game has the appearance of being much more than what was originally there.

Although the conversion herein has been described with reference to a particular embodiment, it is to be understood that this embodiment is merely illustrative of the principles and applications of the present invention. It is therefore to be understood that numerous modifications may be made to the illustrative embodiment and that other arrangements may be devised without departing from the spirit and scope of the present invention as defined by the appended claims.

The invention claimed is:

1. A method for converting a slot machine, the method comprising:

(a) opening a slot machine after a first play of the slot machine, wherein the slot machine includes:
  (i) a housing,
  (ii) at least three reels positioned within the housing, wherein each one of the reels displays a series of symbols, and
  (iii) at least three motors, wherein each one of the motors is coupled to a different one of the reels so as to rotate said reel about an axis;

(b) after opening the slot machine, reorienting at least one of the reels and the motor coupled to said reel within the housing such that the reoriented motor is operable to rotate the reoriented reel about a different axis which extends substantially perpendicular to the axis of at least one of the other reels, wherein the reorienting of the at least one reel includes:
  (i) decoupling the at least one reel from one portion of the housing; and
  (ii) coupling the at least one reel to another portion of the housing;

(c) causing a plurality of different symbols to be displayed by the reoriented reel; and (d) closing the slot machine, wherein the closed slot machine is playable for a second play which results in:
  (i) a first outcome associated with at least one of the reels other than the reoriented reel; and
  (ii) a different, second outcome associated with the reoriented reel.

2. The method of claim 1, wherein the housing defines a lower space and an upper space, the slot machine having a processor located within the lower space.

3. The method of claim 2, including disconnecting the reoriented motor from the processor.

4. The method of claim 3, including relocating the reoriented reel and reoriented motor from the lower space to the upper space.

5. The method of claim 4, including reconnecting the reoriented motor to the processor.

6. The method of claim 1, wherein the housing defines a lower space and an upper space, the at least three reels located within the lower space, and which includes reorienting said at least one of the reels and the motor coupled to said reel in the upper space.

7. The method of claim 6, wherein opening the slot machine includes opening a door connected to the housing to access the lower space.

8. The method of claim 1, wherein the slot machine has at least one window adjacent to the reels.

9. The method of claim 8, including covering at least part of the window.

10. The method of claim 1, including controlling all of the motors according to a common logic.

11. A method for converting a slot machine, the method comprising:

(a) opening a slot machine after a first play of the slot machine, wherein the slot machine includes:
  (i) a housing,
  (ii) at least three reels positioned within the housing, and
  (iii) at least three motors, wherein each one of the motors is coupled to a different one of the reels so as to rotate said reel about an axis;

(b) after opening the slot machine, for at least one of the motors:
  (i) disconnecting from said motor the reel formerly coupled to said motor,
  (ii) coupling a rotatable member to said motor, and
  (iii) orienting said motor and the rotatable member within the housing such that said motor is operable to rotate the rotatable member about a different axis which extends substantially perpendicular to the axis of at least one of the reels; and (c) closing the slot machine, wherein the closed slot machine is playable for a second play which results in:
  (i) a first outcome associated with at least one of reels which is coupled to one of the motors; and
  (ii) a different, second outcome associated with the rotatable member coupled to the oriented motor.

12. The method of claim 11, including connecting a plurality of symbols to the rotatable member.

13. The method of claim 11, including connecting a plurality of symbols to the housing adjacent to the rotatable member.

14. The method of claim 11, including controlling all of the motors according to a common logic.

15. The method of claim 11, wherein the slot machine has at least one window adjacent to the reels.

16. The method of claim 15, including covering at least part of the window.

17. The method of claim 11, wherein the housing defines a lower space and an upper space, the at least three reels located within the lower space, and which includes orienting the rotatable member within the upper space.

18. The method of claim 17, wherein opening the slot machine includes opening a door connected to the housing to access the lower space.

19. A method for converting a slot machine, the method comprising:

(a) opening a slot machine after a first play of the slot machine, wherein the slot machine includes:
  (i) a housing,
  (ii) at least three reels positioned within the housing, and
  (iii) at least three motors, wherein each one of the motors is coupled to a different one of the reels so as to rotate said reel about an axis; and
  (iv) a processor which is operatively coupled to the motors;

(b) decoupling a first one of the at least three motors from a first one of the at least three reels;

(c) after opening the slot machine;
  (i) placing a rotatable member in the housing, and
  (ii) coupling the rotatable member to the first motor such that the rotatable member is operable to rotate about a different axis which extends substantially perpendicular to the axis of at least one of the reels while the first motor is operatively coupled to the processor; and (d) closing the slot machine, wherein the closed slot machine is playable for a second play under control of the processor, wherein the processor uses a common programming to control the at least three motors, wherein the second play results in:
  (i) a first outcome associated with at least one of the reels other than the first reel; and
  (ii) a different, second outcome associated with the rotatable member.

20. The method of claim 19, which includes mounting the rotatable member to the housing.

21. The method of claim 19, wherein coupling the rotatable member to the first motor include electrically connecting the rotatable member to the first motor through a wire, wherein the wire is connected to the first motor.

22. The method of claim 19, wherein placing a rotatable member in the housing includes coupling a bracket to the housing.

23. The method of claim 19, including controlling all of the motors according to a common logic.

24. The method of claim 19, wherein the slot machine has at least one window adjacent to the reels.

25. The method of claim 24, including covering at least part of the window.

26. The method of claim 19, wherein the housing defines a lower space and an upper space, the at least three reels located within the lower space, and which includes placing the rotatable member within the upper space.

27. The method of claim 26, wherein opening the slot machine includes opening a door connected to the housing to access the lower space.

* * * * *